No. 753,317. PATENTED MAR. 1, 1904.
E. L. RUSSELL.
DRIVING AND STEERING MECHANISM FOR MOTOR VEHICLES.
APPLICATION FILED DEC. 2, 1901.
NO MODEL. 2 SHEETS—SHEET 1.
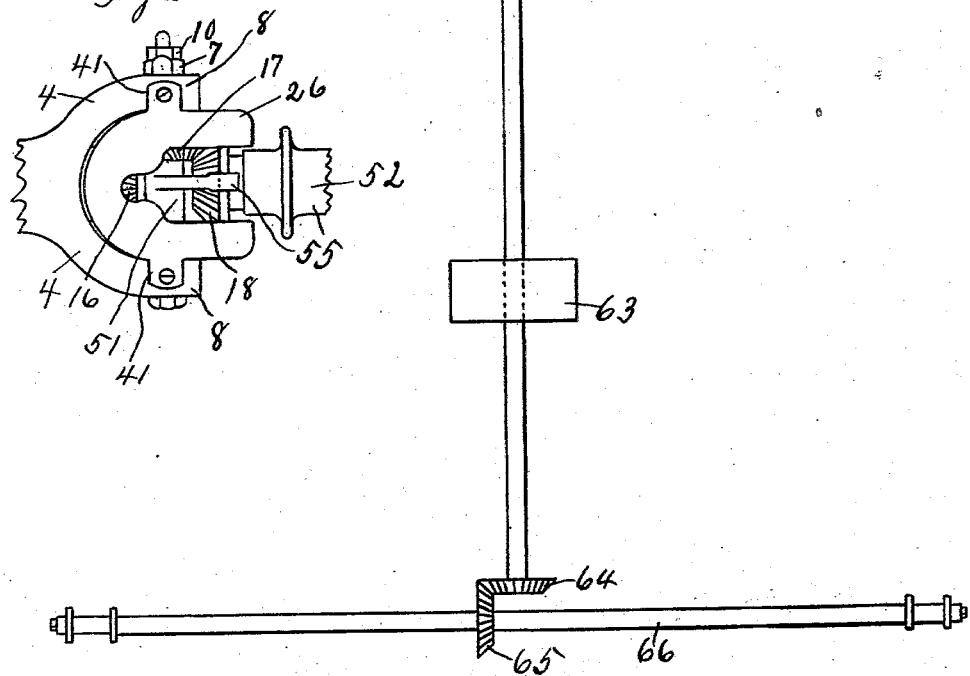
Witnesses:—
J. W. Stitt,
R. Waller
Inventor,
E. L. Russell,
By A. L. Jackson,
Attorney.

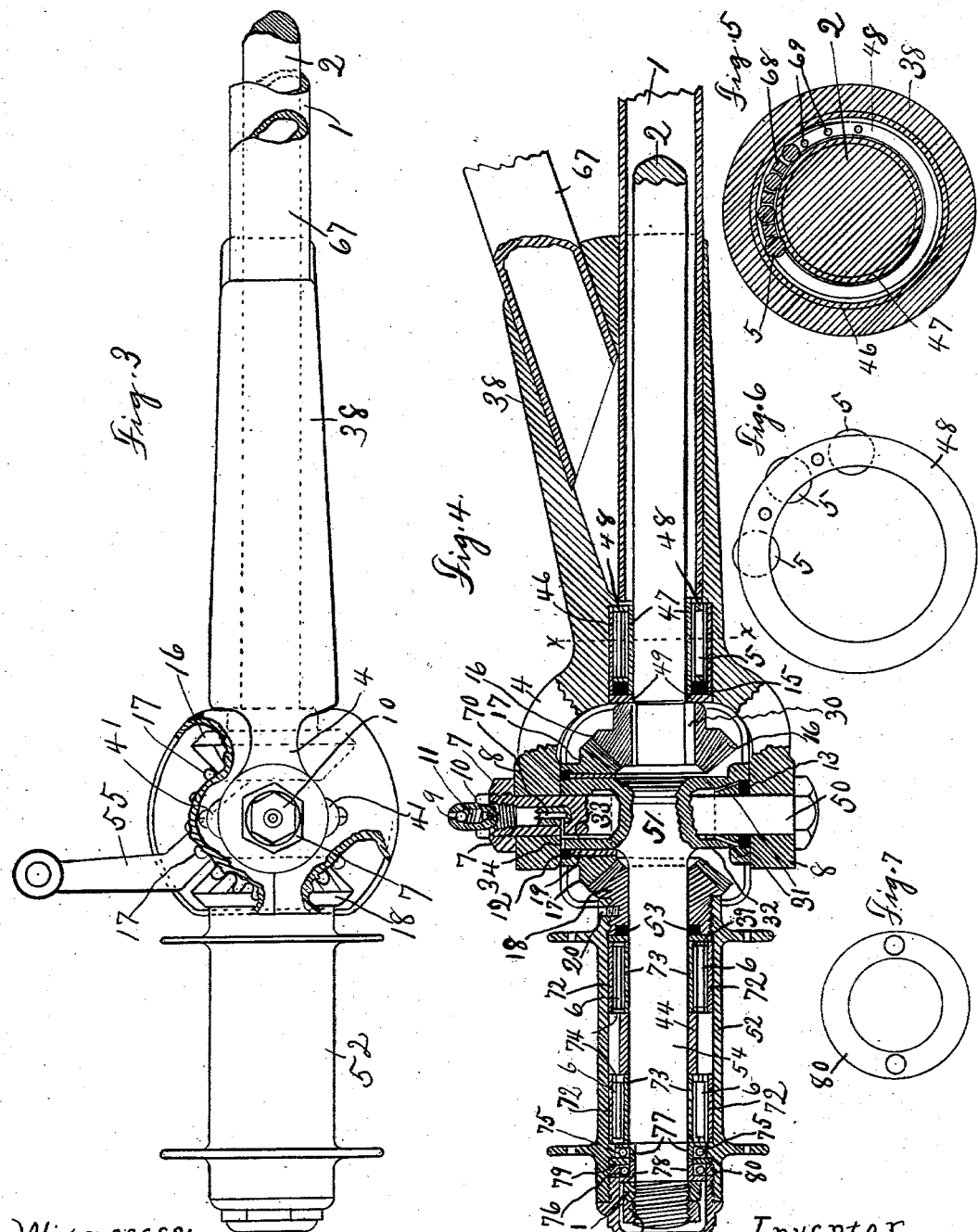

No. 753,317. Patented March 1, 1904.

UNITED STATES PATENT OFFICE.

EDWIN LIVINGSTONE RUSSELL, OF DALLAS, TEXAS.

DRIVING AND STEERING MECHANISM FOR MOTOR-VEHICLES.

SPECIFICATION forming part of Letters Patent No. 753,317, dated March 1, 1904.

Application filed December 2, 1901. Serial No. 84,383. (No model.)

*To all whom it may concern:*

Be it known that I, EDWIN LIVINGSTONE RUSSELL, a citizen of the United States, residing at Dallas, in the county of Dallas and State of Texas, have invented certain new and useful Improvements in Driving-Gear and Steering Mechanism for Motor-Vehicles, of which the following is a specification.

This invention relates to improvements in motor-vehicles, and more particularly to transmission and steering mechanism, and the object is to provide mechanism by which power may be transmitted from the motor to the front wheels of a vehicle as well as to the rear wheels. This will secure more tractive power for drawing heavy loads, climbing hills, and for other purposes where great drafts are needed without increasing the diameters of the tires, and this greater tractive power is obtained without increasing the motive power. This is important where rubber tires are used, because rubber tires cannot be strained beyond a certain limit without breaking. It will be seen that by the use of this improved power-transmitting mechanism the tractive power is practically double.

Other objects and advantages will be fully explained in the following description, and the invention will be more particularly pointed out in the claims.

Reference is had to the accompanying drawings, which form a part of this application.

Figure 1 is a plan view of the running-gear of a vehicle, showing the steering mechanism. Fig. 2 is a rear elevation of a knuckle, showing part of the transmitting mechanism. Fig. 3 is a broken plan view of one knuckle, a part of the casing being broken away to show the driving-gear of the transmitting mechanism. Fig. 4 is a longitudinal section of most of the parts of the steering mechanism, the shaft or axle and the spindle not being in section and other parts being broken away to show more fully the construction of detail mechanism. Fig. 5 is a cross-section along the line $x\,x$ of Fig. 4. Fig. 6 is a detail view of the roller-bearings. Fig. 7 is a detail view of a ring for preventing end play and the end thrust or axial movement of the wheel on the spindle.

Similar characters of reference are used to indicate the same parts throughout the several views.

The front driving axle or shaft 2 is mounted in one of the front tubes 1 of the tubular running-gear of the vehicle. A gear-wheel 60 may be mounted on axle 2, to be driven by the gear 61, which is mounted on a shaft 62 of the motor 63. The same shaft 62 drives the gear-wheel 64, which drives the gear-wheel 65, which drives the axle 66. The steering-fork 4 is mounted on the tubular casing 1 by means of an extended sleeve 38 and roller-bearings 5. The other tubular frame-pieces 67 are mounted in the sleeve 38. It will thus be seen that the front axle runs in the tubular frame-pieces and through the steering-forks. The roller-bearings 5 run between two chilled sleeves. One sleeve, 46, is secured in the steering-fork and the other sleeve, 47, is pressed on the axle 2. The bearings consist of the rollers 5, mounted between said sleeves and held in place by cages, consisting of rings 48 and a series of partition-bars 68 placed between the rollers 5 and having bearings riveted in holes 69 in the rings 48. These rings 48 are kept dust-proof by the felt washers 15, which are held in place by metal rings 49. The power is transmitted across the steering mechanism by means of beveled or mitered gearing. A gear 16 is mounted on shaft 2 and made rigid therewith by a key 30. A pivot-bolt 50 is mounted in bearings 8 of the fork 4 and secured therein by a nut 7 and by the lock-nut 10. The lock-nut 10 serves as an oil-cup for lubricating the gear 17 and steering-knuckle 51, which is pivotally mounted on the bolt 50.

The steering is accomplished by means of the knuckle 51, which is provided with a lever 55, integral therewith. A bronze bearing 19 is mounted on the knuckle 51, and a gear-wheel 17 is mounted on and turns loosely on this bearing. The bearing of the knuckle 51 on the bolt 50 is made dust-proof by felt washers 12 and 13. The nut 10 terminates in a bolt which is screwed in the bolt 50 and has a duct 70 therethrough for the passage of oil. The oil reaches the washer 12 by means of the duct 34, which leads from the duct 70 through the side of bolt 50 and through the side of the knuckle 51 to the washer 12. The knuckle 51 is counterbored at 32, forming an annular passage for oil from the duct 33, which leads from duct 34. The oil reaches the felt washer 13 by means of the ducts 31, which connect with the passage 32. The oil-cup in bolt 10 is kept closed by a ball 9, which is pressed against the mouth of the cup from the interior by a spring 11. This ball can be pressed down for the purpose of pouring oil in the cup. The gear-wheel 18 is screwed into the hub 52 of the wheel and is held therein by the set-screw 20. The hub 52 turns loosely on the spindle 54 by means of roller-bearings 6. The power is thus transmitted across the steering mechanism. Gear-wheel 16 drives the gear 17, which turns loosely on the bronze bearing 19, which is rigidly mounted on the knuckle 51. The gear 17 drives the gear 18, which is rigid with the hub of the wheel. The roller-bearings 6 are kept dust-proof by the felt washer 53, which is mounted in an annular groove turned in the hub of the gear 18. The roller-bearings 6 run between chilled sleeves 72 and 73. The sleeves 72 are rigid in the hub 52 and the sleeves 73 are pressed on the spindle 54. The roller-bearings 6 are held in cages 74, similar in all respects to the cages for roller-bearings 5. The roller-bearings 6 are held in position by the collar 44. The felt washer 53 is held in position by the metal ring 39.

The end of the spindle 54 is provided with ball-bearings 75 and 76 and tracks are provided for the balls. The track for balls 75 consists of a collar 77, having a radial flange and mounted on the reduced portion of the spindle 54, a metal ring 79, and the hub 52 or an inward projection of this hub. The track for balls 76 consists of a collar 78, having a radial flange and mounted on the reduced portion of the spindle 52, the metal ring 79, and a metal collar 80 outside of the balls, which is screwed into the hub 52. A nut 81 holds all these parts in place. A jam-nut 40 holds nut 81 in place. A dust-cap 43 to protect all the inclosed parts from dust is screwed into the hub 52. The dust-cap 43 and the collar 80 and the inner shoulder of the hub 52 will prevent end play or axial movement of the wheel. The collar 80 has two holes by which a specially-constructed wrench can be used to screw this collar in place—that is, a wrench having two prongs for entering these holes for turning the nut or collar.

A casing 26 in two parts is provided for inclosing the power-transmitting gearing. The side of this casing next to the hub has a wide slot therein, so that the hub may have a horizontal swinging movement for the purpose of changing directions. In Fig. 2 parts of the gearing can be seen through this slot. The slot for the hub of the wheel extends one hundred and eighty degrees of the casing, and the slot on the side of the steering-lever extends still farther, so that the lever will not come in contact with the casing. The casing 26 has ears 41, by which the casing may be secured to the bearings 8 of the steering-fork. The casing 26 aids in keeping out the dirt and dust from the steering mechanism and the power-transmitting gear. The felt washers 12 and 13 aid in preventing the dust and dirt from interfering with the knuckle 51 and also serve as means for lubricating the bolt 50 and the bronze bearing 19.

The levers 55 may be shifted by means of a link-bar 82 for causing the front wheels to change direction to either side. Any suitable lever may be attached to the link-bar 82 for operating this bar. Various changes may be made in the power-transmitting gear and the steering mechanism without departing from this invention.

Having fully described my invention, what I claim as new, and desire to secure by Letters Patent, is—

1. Steering mechanism for motor-vehicles comprising a fork mounted on the front axle of the vehicle, a bolt provided with a suitable nut mounted in the arms of said fork, a spindle for the wheel having a knuckle pivotally mounted on said bolt, and means for lubricating said bolt consisting of a combined lock-nut and bolt screwed into said first-named bolt and having an oil-cup therein and an oil-passage through said bolt and an oil-duct from said passage out of said first-named bolt to the surface thereof and onto an oil-well formed in said knuckle.

2. A steering mechanism for motor-vehicles comprising a fork mounted on the front axle of the vehicle, a bolt provided with a suitable nut mounted in the arms of said fork, a non-rotatable spindle for the wheel having a knuckle pivotally mounted on said bolt, and means for lubricating said bolt consisting of a combined lock-nut and bolt screwed into said first-named bolt and having an oil-cup therein and an oil-passage through said bolt and an oil-duct from said passage out of said first-named bolt to the surface thereof and onto an oil-well formed in the said knuckle.

3. A steerable driving mechanism for motor-vehicles comprising a fork mounted on the front axle of the vehicle, a bolt provided with a suitable nut mounted in the arms of said fork, a non-rotatable spindle for the wheel having a knuckle pivotally mounted on said bolt, and roller-bearings for said axle and fork consisting of a sleeve mounted in said fork, a sleeve pressed on said axle, and rollers provided with a suitable cage mounted between said sleeves.

4. In a motor-vehicle provided with a suitable motor; means for transmitting power of said motor to the front wheels of the vehicle consisting of suitable gearing for driving the front axle, sleeves supporting said axle and having forks rigid therewith, non-rotatable spindles having knuckles rigid therewith for coacting with said forks, upright bolts connecting each knuckle with its coacting fork, gearing mounted on said axle, wheel-hubs mounted on said spindles, gearing having their hubs screwed in said wheel-hubs, set-screws for locking said hubs together, and gearing loosely mounted on said bolts and meshing with the gearing of said axle and of said hubs.

5. In a motor-vehicle provided with a steering and driving mechanism for the front axle of the vehicle consisting of forks loosely mounted on the front axle, an axle having spindles coupled to each end thereof, upright pivot-bolts for said spindles, and gearing mounted on said spindles and on said axles and intermediate gearing loosely mounted on said bolts; casings inclosing said gearing mounted on said bolts within said forks for the protection of said gearing, said casings having horizontal slots in the front and rear sides thereof to permit horizontal motion of said spindles.

6. In a motor-vehicle provided with steering mechanism consisting of forks loosely mounted on the front axle of the vehicle and non-rotatable spindles having knuckles integral therewith and pivotally mounted in said forks and having levers integral with said knuckles; means for driving said axle and means for transmitting power from said axle to wheels mounted on said spindles consisting of gearing mounted rigidly on said axle, gearing loosely mounted on said spindles and connected with the hubs of the wheels mounted on said spindles, set-screws locking said gearing and hubs rigidly together, and intermediate gearing loosely mounted on said knuckles and meshing with the gearing on said axle and with the gearing on said spindles.

7. In a motor-vehicle provided with steering mechanism consisting of forks mounted on the front axle of the vehicle and non-rotatable spindles having knuckles integral therewith and pivotally mounted in said forks and having levers integral with said knuckles; means for driving said axle and means for transmitting power from said axle to wheels mounted on said spindles consisting of gearing mounted on said axle, gearing loosely mounted on said spindles and having the hubs thereof connected to the inner ends of the hubs of wheels mounted on said spindles, set-screws locking said hubs rigidly together, and gearing loosely mounted on said knuckles and meshing with the gearing on said axle and the gearing on said spindles in whatever direction said spindles may be turned, and a casing for all of said gearing.

In testimony whereof I set my hand in the presence of two witnesses this 23d day of November, 1901.

EDWIN LIVINGSTONE RUSSELL.

Witnesses:
   GEO. F. THOMPSON,
   GEO. M. SOXMAN.